(12) United States Patent
Gokcebay et al.

(10) Patent No.: US 6,826,935 B2
(45) Date of Patent: Dec. 7, 2004

(54) MECHANICAL/ELECTRONIC LOCK AND KEY THEREFOR

(75) Inventors: Asil T. Gokcebay, Petaluma, CA (US); Yucel K. Keskin, Santa Clara, CA (US); Robert E. Kearns, San Francisco, CA (US)

(73) Assignee: Security People, Inc., Petaluma, CA (US)

( * ) Notice: Subject to any disclaimer, the term of this patent is extended or adjusted under 35 U.S.C. 154(b) by 0 days.

(21) Appl. No.: 10/126,501

(22) Filed: Apr. 19, 2002

(65) Prior Publication Data

US 2002/0189307 A1 Dec. 19, 2002

Related U.S. Application Data

(63) Continuation-in-part of application No. 09/461,514, filed on Dec. 14, 1999, now Pat. No. 6,374,653, which is a continuation-in-part of application No. 08/995,684, filed on Dec. 22, 1997, now Pat. No. 6,000,609.

(51) Int. Cl.[7] .......................... E05B 49/00; E05B 47/06
(52) U.S. Cl. ....................... 70/278.3; 70/283.1; 70/277; 70/496; 340/5.2
(58) Field of Search ............ 70/276, 277, 278.1–278.3, 70/279–283.1, 495, 496; 340/5.2

(56) References Cited

U.S. PATENT DOCUMENTS

| | | | | |
|---|---|---|---|---|
| 4,712,398 A | * | 12/1987 | Clarkson et al. | 70/276 |
| 4,789,859 A | * | 12/1988 | Clarkson et al. | 340/5.2 |
| 4,798,068 A | * | 1/1989 | Nakauchi | 70/276 |
| 4,848,115 A | * | 7/1989 | Clarkson et al. | 70/276 |
| 4,916,927 A | * | 4/1990 | O'Connell et al. | 70/276 |
| 5,018,375 A | * | 5/1991 | Tully | 70/472 |
| 5,140,317 A | * | 8/1992 | Hyatt et al. | 340/5.25 |
| 5,351,042 A | * | 9/1994 | Aston | 340/5.2 |
| 5,495,733 A | * | 3/1996 | Yen et al. | 70/278.3 |
| 5,507,162 A | * | 4/1996 | Chhatwal | 70/283 X |
| 5,542,274 A | * | 8/1996 | Thordmark et al. | 70/495 |
| 5,552,777 A | * | 9/1996 | Gokcebay et al. | 70/278 |
| 5,628,217 A | * | 5/1997 | Herrera | 70/278.3 |
| 5,685,182 A | * | 11/1997 | Chhatwal | 70/283 X |
| 5,819,563 A | * | 10/1998 | Bianco | 70/278.3 |
| 5,839,305 A | * | 11/1998 | Aston | 70/278 |
| 5,839,307 A | * | 11/1998 | Field et al. | 70/283 |
| 6,000,609 A | * | 12/1999 | Gokcebay et al. | 70/277 X |
| 6,067,826 A | * | 5/2000 | Holloway et al. | 70/278.3 |
| 6,363,762 B1 | * | 4/2002 | Kueng | 70/278.3 |
| 6,374,653 B1 | * | 4/2002 | Gokcebay et al. | 70/278.3 |
| 6,382,003 B1 | * | 5/2002 | Watanuki et al. | 70/278.3 X |
| 6,442,986 B1 | * | 9/2002 | Russell et al. | 70/278.3 |
| 6,474,122 B2 | * | 11/2002 | Davis | 70/278.3 |
| 6,477,875 B2 | * | 11/2002 | Field et al. | 70/495 X |
| 6,523,377 B1 | * | 2/2003 | Vonlanthen | 70/278.3 |
| 6,564,601 B2 | * | 5/2003 | Hyatt Jr. | 70/278.3 |
| 2002/0124610 A1 | * | 9/2002 | Harwood | 70/278.3 |

* cited by examiner

*Primary Examiner*—Suzanne-Dino Barrett
(74) *Attorney, Agent, or Firm*—Thomas M. Freiburger

(57) ABSTRACT

Locks and keys are disclosed with electromagnetic as well as mechanical actuation. Several forms of reverse sidebar are described, avoiding binding of the lock release mechanism by premature turning of the key by a user. An embodiment of a system is described wherein the lock units are in radio communication with a control console, for setting access parameters and monitoring accessing events at each of the various locks.

3 Claims, 11 Drawing Sheets

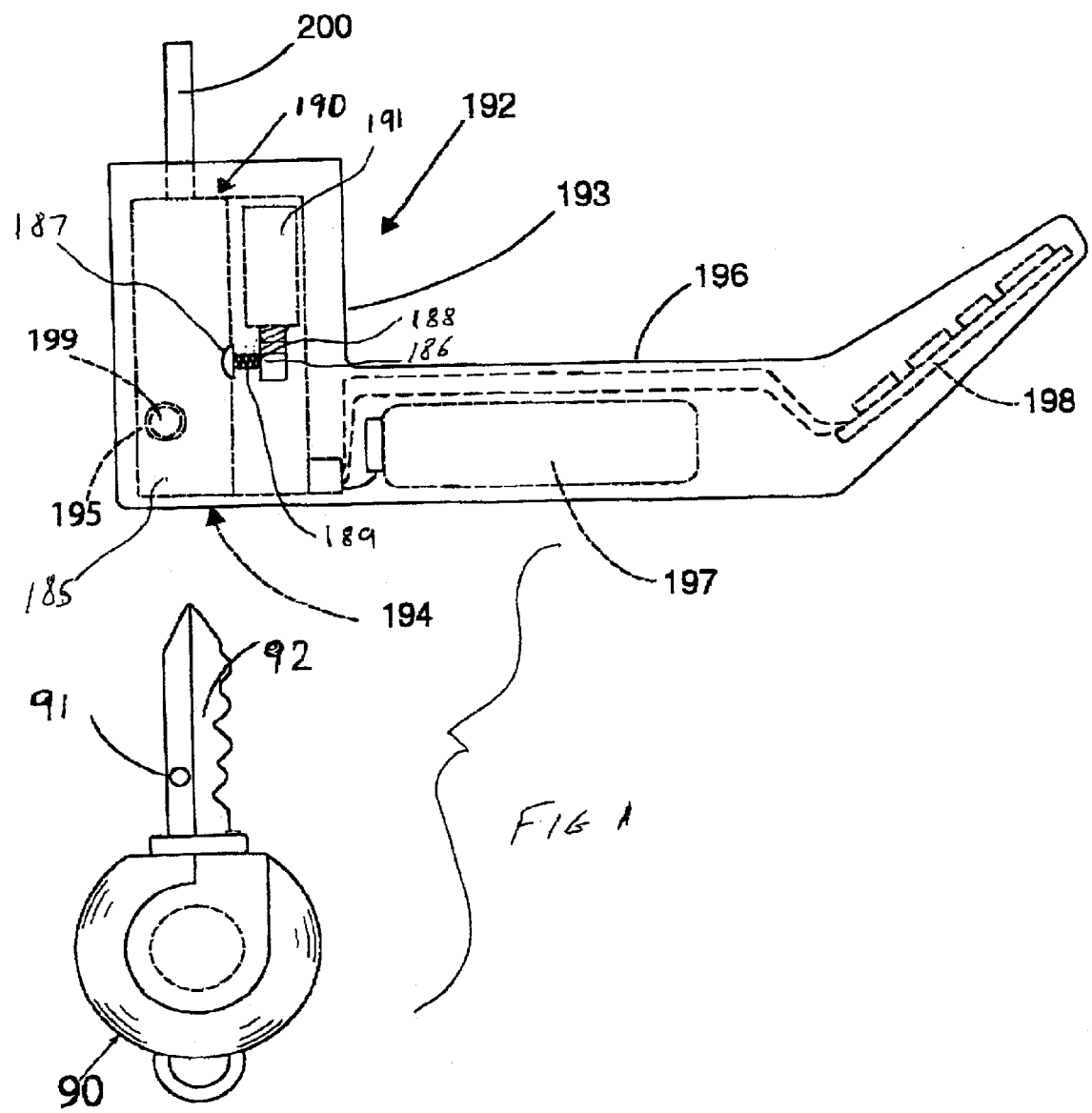
FIG A

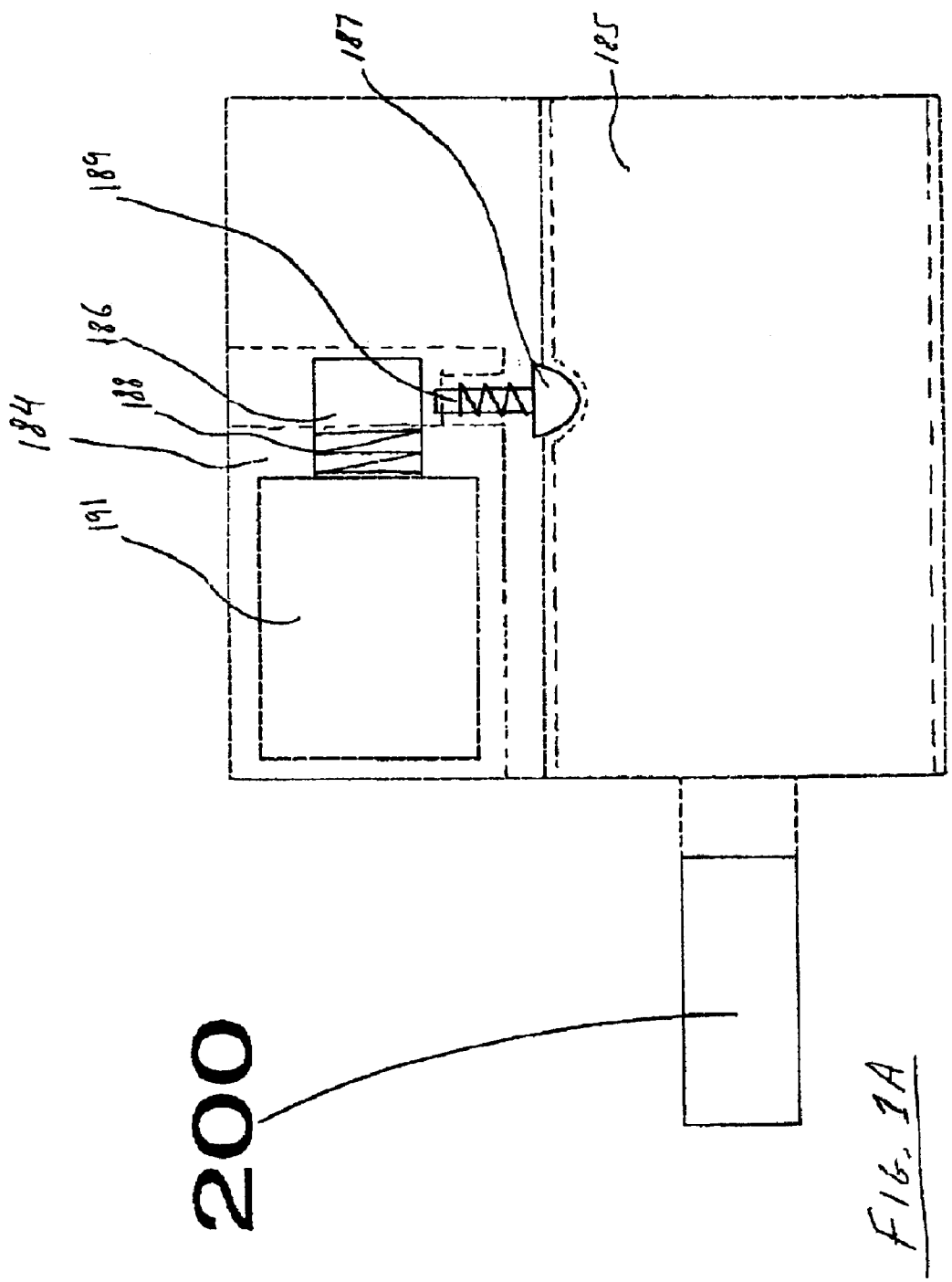

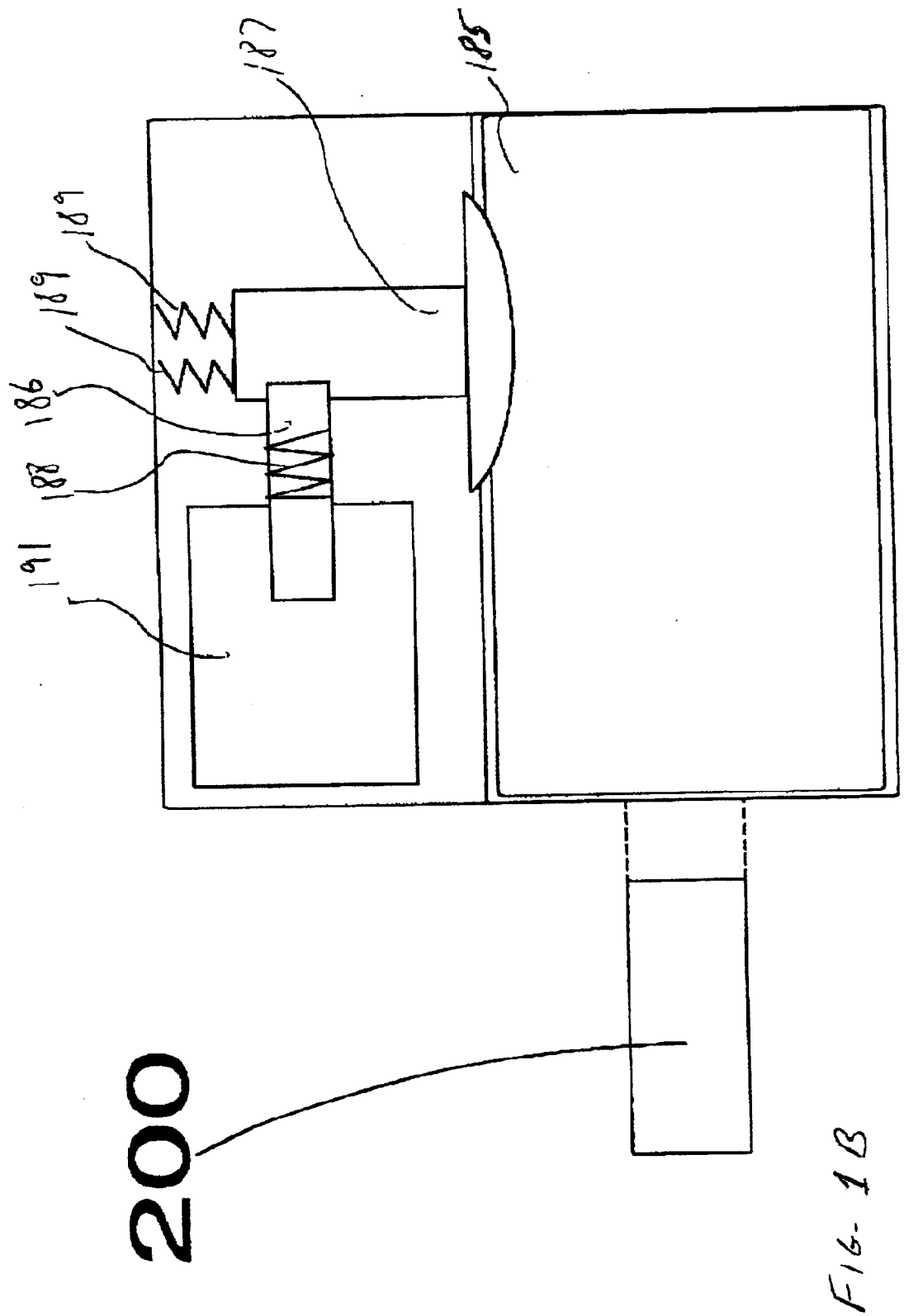

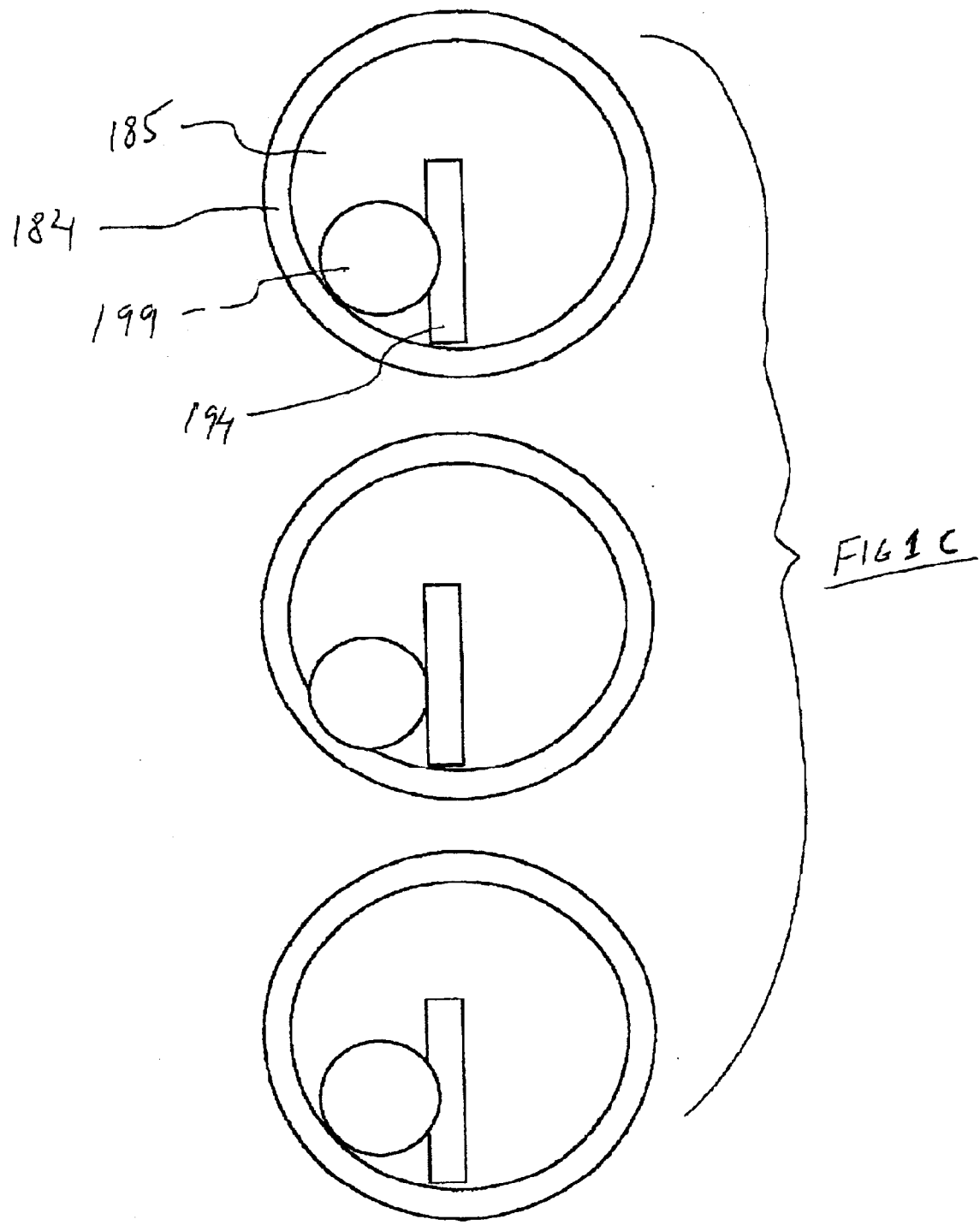

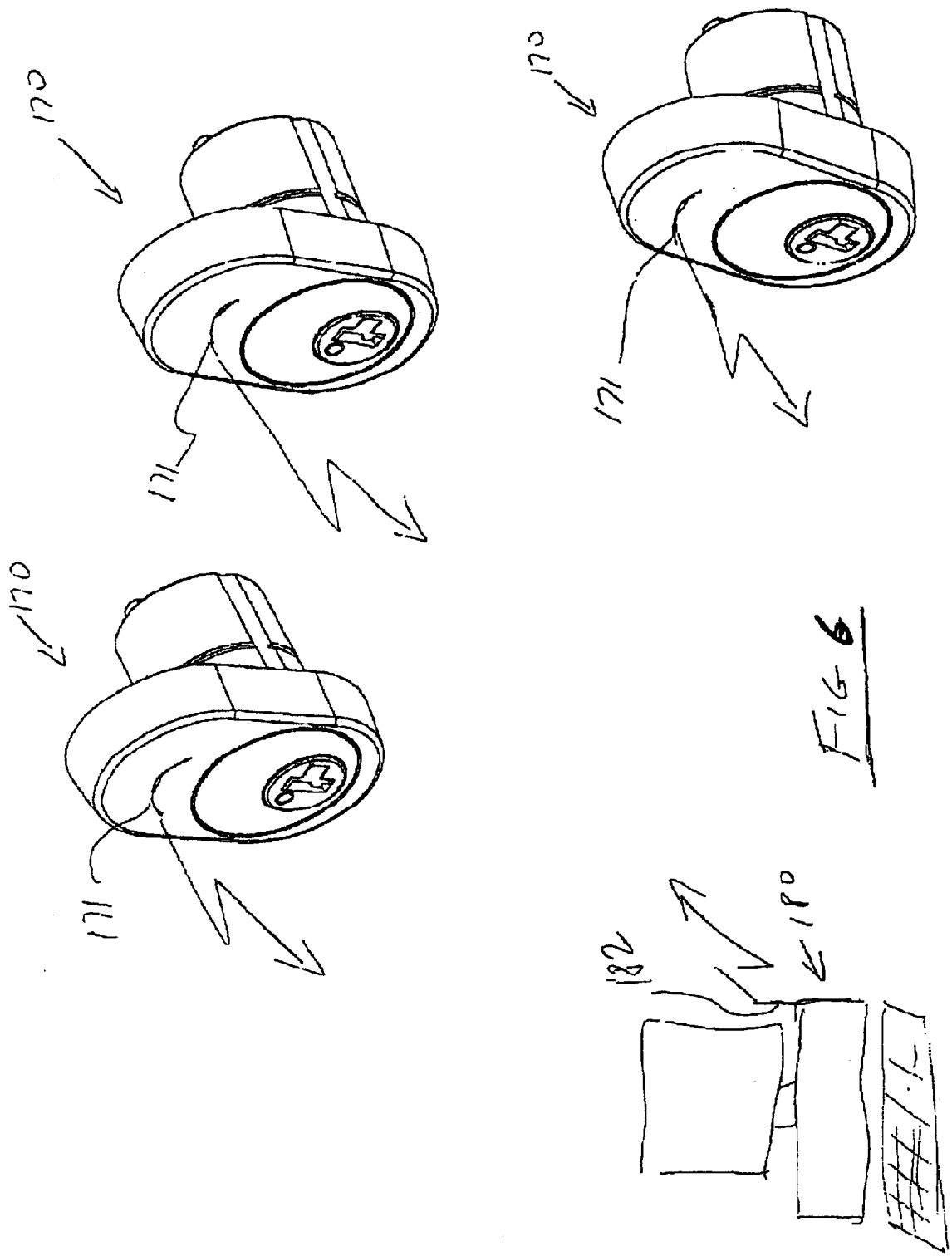

MECHANICAL/ELECTRONIC LOCK AND KEY THEREFOR

This application is a continuation-in-part of application Ser. No. 09/461,514, filed Dec. 14, 1999 now U.S. Pat. No. 6,374,653, which is a continuation-in-part of application Ser. No. 08/995,684, filed Dec. 22, 1997 now U.S. Pat. No. 6,000,609.

BACKGROUND OF THE INVENTION

This invention is in the field of security and access control, and the invention particularly concerns access to door locks and other situations wherein numerous electronic or electro mechanical keys fit a single or a group of locks and wherein there is a need to control the instances of opening each lock and in some situations to maintain a record thereof.

In the past, a number of electronic security features have been added to mechanical locks which use mechanical types of cylinders. In addition, locking elements controlled by electronic means have been disclosed in combination with non-mechanical types of tumblers, such as in Clarkson et al. U.S. Pat. No. 4,712,398. In some cases electronic elements have been added to mechanical elements requiring both mechanical and electronic elements to be present before granting access such as Spahn et al. U.S. Pat. No. 5,469,727. Some of the existing electronic systems have employed keypads, some have employed cards, some have had purely electronic, magnetic or optical access control devices, and some have employed mechanical keys equipped with electronic circuitry.

With respect to the present invention, distinction is made among purely electronic, magnetic or optical keys; mechanical keys equipped with electronic, magnetic or optical features; and mechanical keys which operate solely by mechanical bittings, whether those bittings be pin tumbler, dimples or other mechanical patterns.

A key comprised of purely electronic circuitry, magnetic or optical data storage for determining and granting access is an electronic key. In the use of such a key, the circuitry or recorded data is transferred to a reader associated with a lock, and the reader recognizes a pattern or code held by the key. The key does not carry any mechanical cut or bitting configuration needed for granting access even though the key holding the data or the pattern may be used for turning the lock. Keys of this type can be found in U.S. Pat. No. 3,797,936 (Dimitriadis), U.S. Pat. No. 4,209,782 (Donath et al.), U.S. Pat. No. 4,257,030 (Bruhin et al.), U.S. Pat. No. 4,620,088 (Flies), U.S. Pat. No. 4,659,915 (Flies) and U.S. Pat. No. 4,789,859 (Clarkson et al.).

Keys referred to as mechanical keys are those which activate a mechanical device, with a pattern of mechanical bittings, by direct contact with the interpreting device, i.e. the tumblers or other pattern-holding apparatus contained in the lock. In a typical pin tumbler lock, access is granted based on the depth and configuration of key cuts meeting the tumblers. In most cases, once proper alignment is established in the tumblers, the keyholder is able to turn the key to lock and unlock the locking device. However, in some cases of mechanical keys, a push or pull action may be necessary for locking and unlocking of the device. The tumblers mentioned above can be pin tumblers, lever tumblers, disk tumblers, rotary disk tumblers, slider tumblers, or combinations of several of these incorporated within the same lock. Examples of purely mechanical keys are found in U.S. Pat. No. 480,299 (Voight), U.S. Pat. No. 550,111 (Sargent), U.S. Pat. No. 564,029 (Sargent), U.S. Pat. No. 3,208,248 (Tornoe), U.S. Pat. No. 4,723,427 (Oliver), U.S. Pat. No. 4,732,022 (Oliver) and U.S. Pat. No. 4,823,575 (Florian et al.).

Examples of mechanical keys equipped with electronic circuitry, magnetic or optical data storage or optical recognizable features ("electromechanical keys") can be found in U.S. Pat. No. 3,733,862 (Killmeyer), U.S. Pat. No. 4,144,523 (Kaplit), U.S. Pat. No. 4,326,124 (Faude), U.S. Pat. No. 4,562,712 (Wolter), U.S. Pat. No. 4,663,952 (Gelhard), U.S. Pat. No. 4,686,358 (Seckinger et al.), U.S. Pat. No. 5,245,329 (Gokcebay), U.S. Pat. No. 5,367,295 (Gokcebay et al.) and U.S. Pat. No. 5,140,317 (Hyatt, Jr. et al.). Such keys carry the secondary element, whether it comprises electronic circuitry or some other type of coded data or recognizable pattern, in addition to the key's mechanically operating pattern or bitting. In some instances both mechanical and non-mechanical features of a key are used simultaneously.

A lock cylinder is the control mechanism which grants access to the lock. A mechanical lock cylinder is the control mechanism which grants or denies access to the lock based on the mechanical key being used. The mechanical configuration, i.e. the cuts on the key, has to match to the meeting mechanical configuration i.e. the tumblers of the cylinder before the key will turn in the cylinder and this turning motion will engage the latch or bolt mechanism of the lock via a cylinder cam or tail piece causing the locking or unlocking of the lock. The cylinder mechanism of the lock is generally a separate module, which can be easily removed and replaced. In certain types of locks the physical characteristics of the cylinders and their receiving cavity is standardized so one brand cylinder will fit or replace another brand of cylinder. Mortise, locks using mortise (regular or removable core) or profile cylinders (eurocylinder) and rim locks using rim cylinders are good examples. The cylinder size and shape differ on bored door locks such as knob or lever locks, and deadbolt locks. Thus, one can separate the mechanical lock cylinders into two categories, those that are standard in size and shape, and those that are brand specific. With the standard cylinders one brand cylinder will replace another instantly without any modification to the lock, door or the cylinder.

There are several cylinder manufactures who specialize in making replacement cylinders which fit in other brands of locks. In some cases these are specialized high security cylinders increasing the security of the lock by offering sophisticated locking principles and key control. Also several lock manufacturers have recently started to manufacture non standard (brand specific) cylinders that fit to their competitors' locks. This is generally a marketing issue wherein by making cylinders that fit into the competitors' locks and setting up key systems using their own keyway (grooving and slotting of the key and receiving plug), they lure the customer to buy their locks for future needs. Since in order for the new locks to fit in to the keying system they need to be the same keyway, the customer opts to buy their brand of lock for future use.

It has been desirable to add electronic security and access control features to mechanical locks since, for one thing, it is not possible to regulate the date, day and time of access using purely mechanical keys and meeting tumblers. Changing the combination of a lock when a key is compromised usually requires tumblers to be changed and all of the operating keys to be replaced which is costly. Also the number of unique combinations or permutations that can be achieved using purely mechanical keys and meeting tumblers is relatively low, and further security is often needed.

Many examples of purely electronic and electronic and mechanical combinations of control elements exist in the above referenced patents. Some of these inventions teach an instant replacement of the cylinder unit to fit to existing locks without further modification to the lock or the door. In most cases the cylinder unit acting as an electronic reader, having additional parts or components that are connected by wires to other parts of the lock or the door, requires modification of the door and/or the lock. These components generally are circuit boards containing decision-making electronics, batteries and electrically operated locking elements such as solenoids and motors.

The present invention relates to the electromechanical cylinders operated by a key device wherein the key device is turned to achieve locking or unlocking of the lock by the user of the key device and the key device will turn in the cylinder upon meeting the access criteria—whether mechanical electronic or both—and this turning motion will engage the latch or bolt mechanism of the lock via a cylinder cam or tail piece causing the locking or unlocking of the lock regardless of standard replacement or brand specific cylinder.

Examples of patents disclosing electromechanical cylinder units can be found in following U.S. patents: Clarkson et al. U.S. Pat. No. 4,712,398 shows a cylinder operated by entirely electronic criteria. The key "which closely resembles a traditional mechanical key without the usual bittings" contains electronic circuitry or memory in the key blade, which when inserted into the receiving cylinder, turns and operates the cylinder if the data contained in the key matches the data stored in the receiving cylinder, by actuation of an electrically operated blocking mechanism in the cylinder. Another similar system although not self contained disclosed in Chhatwal U.S. Pat. No. 5,337,588 (and also Chhatwal U.S. Pat. No. 5,507,162) employs an opto-electronic communication between the lock and the key for transmitting data contained in the key to the cylinder for requesting access. In addition the key makes physical contact with the cylinder unit via an isolated contact on the key blade to power the key electronics. The decision making electronics are located outside the cylinder and connected to the cylinder via a cable. A cylinder disclosed by Spahn et al. U.S. Pat. No. 5,469,727 requires both mechanical and electronic elements to be present before granting access. U.S. Pat. No. 5,140,317, Hyatt Jr. et al. also referenced above, discloses a combined mechanical lock/key combination which further includes an electronic feature for permitting opening of each lock in a system of similarly-keyed locks, only when authorized, and with a recording of each lock opening made. The lock includes a retractable blocking means which blocks opening of the lock's bolt, separately from the mechanical bitting, except when prescribed conditions are met. When a solenoid in the lock is activated the blocking means is retracted. The lock also includes its own microprocessor, which controls switching of power to the solenoid, and with a memory within the lock storing data. A cylinder described by the present applicant in the co-pending application No. 461,514 utilizes a reverse sidebar cylinder blocking mechanism wherein the binding of the blocking means is eliminated in case of pressure placed on the blocking means by turning of the key prematurely. Also in the same application another reverse sidebar cylinder blocking application is shown in a self-contained lever situation.

All of the cylinders described above use an electrically operated blocking means, generally a small solenoid or a motor that is released or turned allowing the turning of the key. Many of these blocking means are prone to binding by the premature turning of the key with anticipation by the keyholder, except the blocking means arrangements shown by the present inventor.

All of the cylinders described above require a programming device wherein this device is carried all the way to the cylinder for programming. In some instances this device is a special key and is inserted into the cylinder to download the data and some instances it communicates with the cylinder via a small cable-connector or infrared communication between the programming device and the cylinder.

The object of the present invention to disclose numerous improved electrically operated blocking means. In additional aspects of the invention, it is an object to provide two wireless communication scheme for programming the electromechanical cylinders of the invention wherein the lock cylinders are programmable with the valid operating keys, in addition limiting the times and dates of the keys' operation as well as providing means for some of the keys to work only a set number of times, and in another embodiment, to record each instance of access to a lock, by key number, in the situation of a lock accessible by a number of different keys and in another embodiment collect service-related data from the cylinders for creating service reports and schedules.

SUMMARY OF THE INVENTION

In accordance with the present invention, a key is turned in a lock cylinder to open or lock a locking device. The lock cylinders may or may not contain tumblers or other mechanical combination to be met by a mechanical key. Upon meeting the access criteria the electrically operated lock blocking means is released allowing the key to turn. In one specific embodiment the cylinder plug is blocked by an elongated bar (reversed sidebar) with a "v" or "u" shaped end facing the cylinder plug with the cylinder plug having a matching groove. The movement of the reversed sidebar is controlled by the electrically operated blocking means and is spring biased against the cylinder plug. The turning of the cylinder plug cams the reversed sidebar out of the cavity when the movement of the reversed sidebar is not blocked by the electrically operated blocking means. The blocking of the movement of the reversed sidebar is achieved in a number of schemes where the binding of the electrically operated blocking means is eliminated.

In one preferred embodiment the shaft of the solenoid directly blocks the shaft of the reversed sidebar from moving thus preventing the turn of the cylinder plug. A spring pushes the sidebar towards the cylinder plug clearing the way for the uninterrupted movement of the solenoid shaft. Additional binding protection is provided by a small ball placed in a cavity inside the cylinder plug between the exterior of the cylinder plug and the keyway profile. The ball obstructs the keyway slightly when completely contained within the plug. When a key is inserted the ball is pushed outward and into the additional cavity in the cylinder shell thus further locking the cylinder plug and shell. This locking continues until the key is fully inserted and at which time a cavity on the key blade is aligned with the ball allowing it to disengage from the cylinder shell. This arrangement provides the necessary protection to the electrically operated blocking means as the cylinder plug is locked by the ball unable to turn prematurely to put pressure on the electrically operated blocking means until the key is fully inserted. When the key is fully inserted the decision to grant access is instantly made and the electrically operated blocking means is activated allowing the cylinder plug to cam out the reversed sidebar and turn. Upon return of the plug to the locking position the spring biased reversed sidebar reengages the plug re-locking it again.

In another embodiment the unblocking is created by movement of the locking member indirectly by the release of the solenoid. In this embodiment the solenoid with the power of its spring moves a locking member in a shape of a flat wafer upwards blocking the shearline. The tip of the solenoid's plunger is conic shaped and in its unpowered mode moves the locking wafer by riding on a hole of the wafer by the force of its plunger spring. The wafer is spring loaded with a small spring which in its relaxed condition keeps the wafer away from the shearline; however, since the plunger spring is more powerful than the wafer's spring the wafer blocks the shearline. Upon powering of the solenoid the plunger is pulled in, leaving the wafer spring to move the wafer away from the shearline, allowing the cylinder plug to turn. The wafer hole is oval shaped to allow the retraction of the solenoid plunger even if pressure is applied to the cylinder plug from a prematurely turning key.

In one preferred embodiment the access data is programmed to the electromechanical cylinders via a set of wireless transceivers. Each cylinder contain a small transceiver powered by the power source of the cylinder. Each cylinder has a unique identification number recognized by the system database located at the central computer which is also equipped with one or more transceivers for communication with the cylinders. In one preferred communication scheme the new programming data is uploaded to the cylinder when the cylinder asks for this data. Cylinders are set to ask for updated data, if any, from the central database in predetermined intervals such as every ten minutes. If there is any change in the data, the new data is uploaded to the cylinder and also any access data that has been collected by the cylinder is downloaded to the central database for history and report generation as well as any service data such as battery status for servicing of the cylinders. This communication protocol uses minimal amount of power by minimizing the amount of communication between the cylinders and the central database.

In another preferred communication scheme the transceivers are always awake waiting for a call from the central computer, which scans all the cylinders as necessary for upload and download of data. When called by the central computer the cylinder answers and engages in the communication protocol. In this half duplex communication scheme the communication between the cylinders and the central computer is always initiated by the central computer.

In yet another preferred communication scheme the cylinders are always active and do not store the access data at the cylinder but access the data each time there is a request for access by presence of a key requesting access.

These and other objects, advantages and features of the invention will be apparent from the following description of a preferred embodiment, considered along with the accompanying drawings.

DESCRIPTION OF THE DRAWINGS

FIG. 1 is a schematic side view showing a cylinder and a key showing an electrically operated blocking mechanism in conjunction with a reversed side bar and locking ball components of the invention.

FIG. 1A is a enlarged schematic side view of FIG. 1 showing the components of the electrically operated blocking means comprised of spring biased reversed side bar and solenoid arrangement.

FIG. 1B is a enlarged schematic side view of FIG. 1 showing the components of the electrically operated blocking means comprised of spring biased reversed side bar and solenoid arrangement with an alternative configuration.

FIG. 1C is a sequence sectional view of the cylinder of FIG. 1 where the locking ball and its movement is shown as the key (not shown) is inserted in the cylinder.

FIG. 6 shows number of cylinders of FIG. 5 with a central computer containing the database transceiver and antenna.

DESCRIPTION OF PREFERRED EMBODIMENTS

Figure 1D:
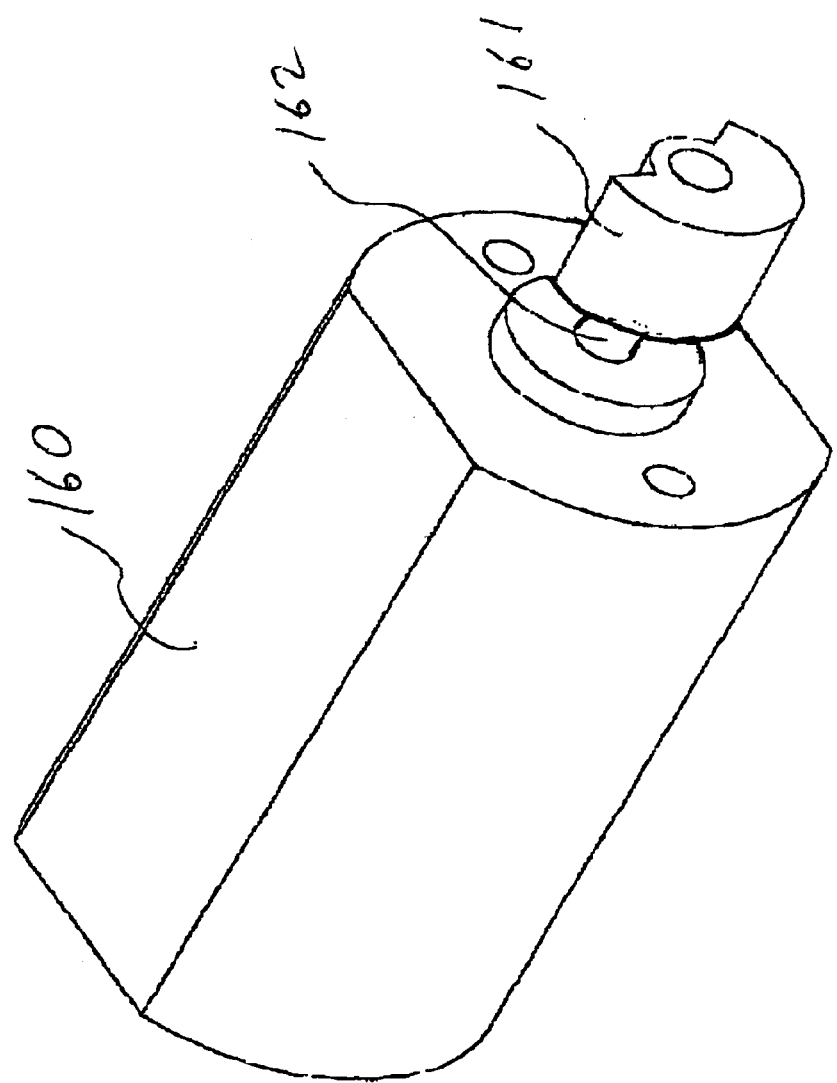
FIG. 1D is a perspective view of an alternative electrically operated blocking means comprising of a small motor with a half round cam.

FIG. 1 shows a self-contained lever 192 fitted with a electromechanical cylinder 190. The cylinder contains the electrically operated blocking means 191 which is a small solenoid fitted with the plunger 186 and spring 188. The plunger 186 is projected outwardly by the spring 188 until the solenoid is energized and pulled back clearing the way for the reversed sidebar 187 to cam out of its locking position by turning of the cylinder plug 185. A small ball 199 is placed in to the cavity 195 which blocks the cylinder plug from turning until the key 90 is fully inserted. This arrangement is shown and explained more clearly in FIGS. 1A and 1B and 1C.

FIG. 1A shows the cylinder of FIG. 1 enlarged for better explanation. The cylinder plug 185 is blocked from turning by reversed sidebar 187. The reversed sidebar 187 is spring biased towards the cylinder plug by the spring 189. When turned, the cylinder plug 185 cams the reversed sidebar 187 away from itself to allow its' turning. However, the movement of the shaft of the reversed sidebar 187 is blocked by the plunger 186 or shaft of solenoid 191. The plunger 186 is spring biased by the compression spring 188 providing continuous locking of the reversed sidebar 187 until energized at which time the plunger is out of the way of the sidebar 187 further allowing the sidebars free movement when cammed by the cylinder plug 185 allowing the turning of the cylinder plug 185. With the turning of the cylinder plug 185 the cam or tail piece of the cylinder is engaged with the bolt or latch mechanism operating the lock. The solenoid device 191 is imbedded in a cavity inside the shell 184 of the cylinder. The reversed sidebar 187 is also placed in a cavity providing vertical motion spring biased against the cylinder plug 185. In this arrangement the spring 189 pushes the sidebar 187 towards the cylinder plug 185 clearing any pressure that may be placed on the solenoid shaft 186, however, if a strong pressure is applied premature turning of the cylinder plug 185 will push the reversed sidebar 187 against the solenoid shaft 186 and binding it. The ball arrangement discussed earlier prevents this binding. As shown in detail in FIG. 1C the ball 199 is placed in a cavity inside the cylinder plug 185. The cavity is laterally larger and also includes a portion in the cylinder shell 184. In its normal condition the ball 199 stays within the cylinder plug 185 partially blocking key slot 194. Upon presence of a key 90 (not shown) inserted into the key slot 194 the ball moves towards the cylinder shell 184 providing blocking of the cylinder plug 185 against the cylinder shell 184. This continues until the key 90 is fully inserted at which time the cavity 91 in the key blade 92 is lined up with the ball allowing the ball to return and no longer block the cylinder plug 185 from turning. This arrangement provides a positive locking of the cylinder plug 185 preventing its camming motion and therefore eliminating any binding that may be caused against the plunger 186 by the reversed sidebar 187. The electronic data communication between the key 90 and the cylinder is arranged so that the communication is completed slightly before the key is completely inserted thus providing enough time for the decision to unlock by retraction of the solenoid shaft 186 without any binding interference. The combination of reversed sidebar and ball provides positive blocking of the cylinder plug 185 for a binding free operation of the electrically operated blocking means. FIG. 1B shows an alternate arrangement wherein the solenoid plunger 186 enters into a cavity of the reversed sidebar 187 and blocks its movement. The springs 189 are located on top of the reversed sidebar 187 pushing it downward. This spring 189 maybe a flat coil spring or other type of spring as well a compression spring. The length of the "U" or "V" shaped portion of the reversed sidebar 187 maybe as long as the length of the cylinder plug 185 or shorter. FIG. 1D shows a small motor 160 with a cylindrical cam 161 attached to the shaft of the motor 162. A slight turn of the motor provides space for the reversed sidebar 187 to move upward. This motor 160 maybe used in place of the solenoid 191 in both arrangements described in FIG. 1A and 1B in conjunction with the ball located in the cylinder plug 185.

Figure 2:
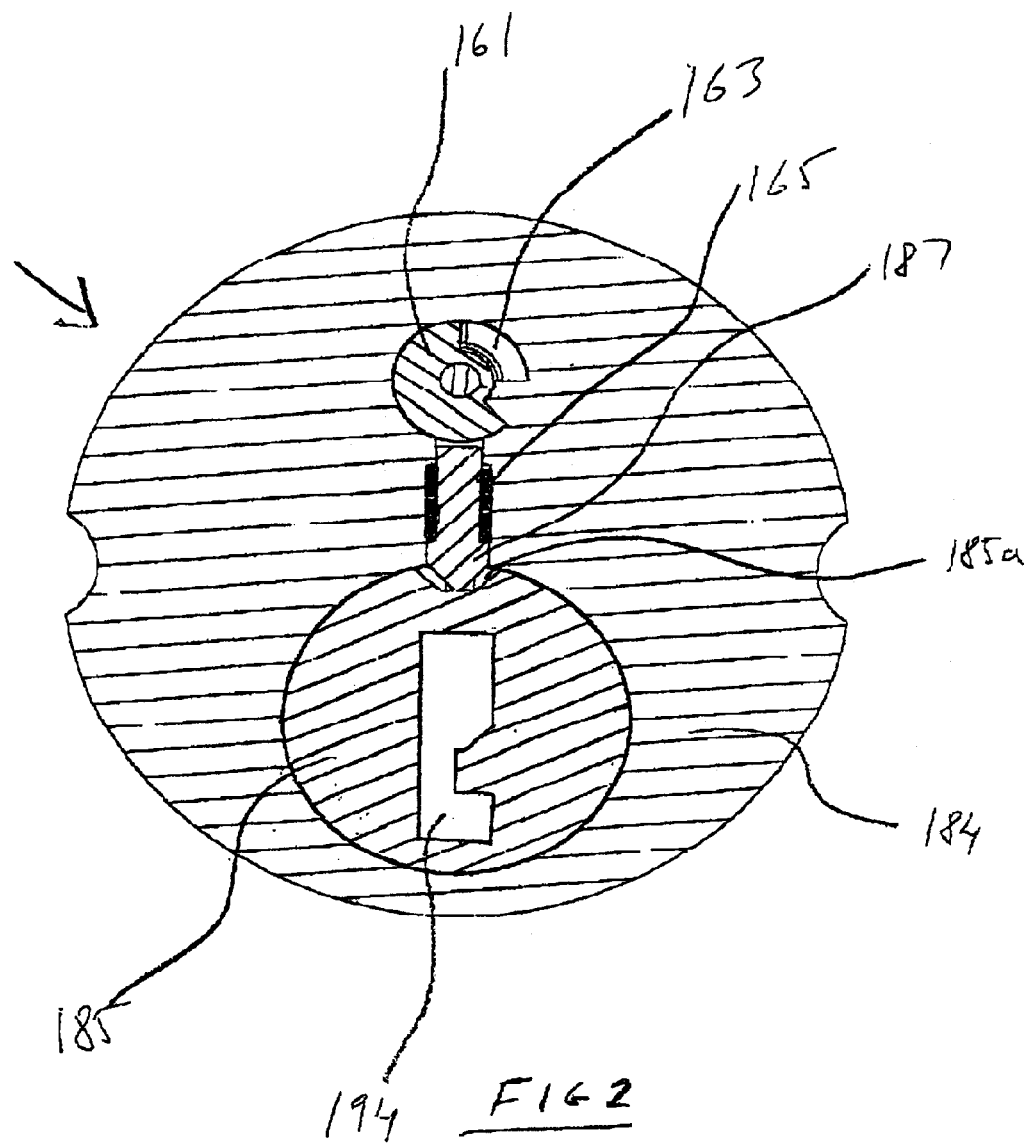
FIG. 2 is a sectional view of a cylinder equipped with an electrically operated blocking means utilizing a motor with a specially shaped cam and spring mechanism.
Figure 3:
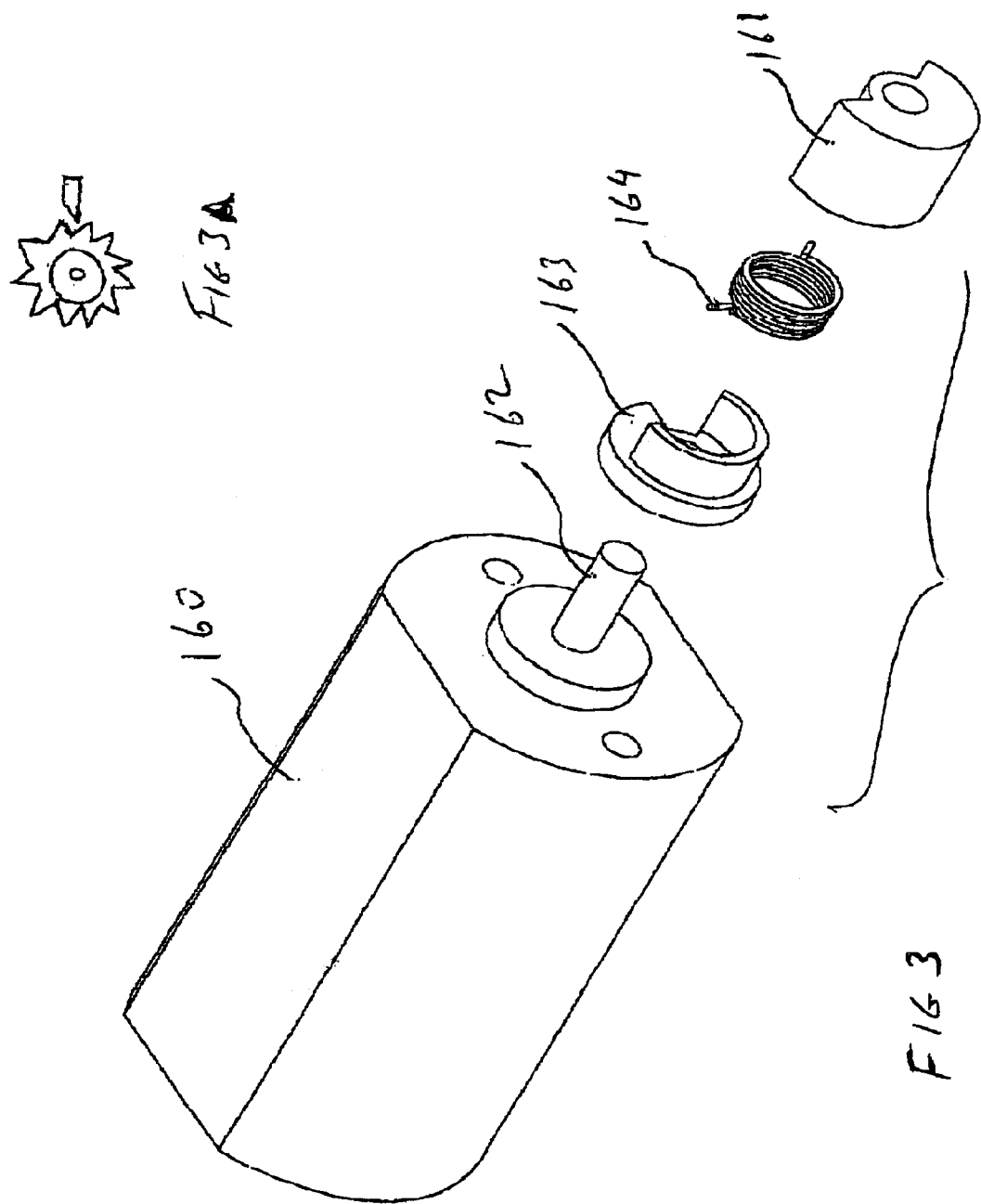
FIG. 3 is an exploded perspective view of the components of the electrically operated blocking means of FIG. 2.

FIG. 2 shows an alternate arrangement of a small motor 160 equipped with a cam 161 and a torsion spring 164 and a spring hub 163 providing positive blocking for the reversed sidebar 187. This arrangement maybe used in several ways providing bind free operation for the electrically operated blocking means. In this arrangement, when the power is applied to the motor 160 the cam 161 turns to provide necessary free space for the reversed sidebar 187 to move upward. However, if there is binding caused by premature turning of the cylinder plug 185 pushing the reversed sidebar 187 against the cam 161, then the hub 163 turns and extends the torsion spring 164. The torsion spring 164 is connected between the hub 163 and cam 161. When the binding pressure is released, the torsion spring 164 causes the cam 161 to turn automatically to its intended position. This arrangement requires that the motor 160 stays in position when no longer powered and does not revert back under the pressure of the torsion spring 164. Depending on the motor used, this may require a small gear mechanism shown in FIG. 3A that allows only one directional movement of the motor cam 161. In another arrangement the motor 160 is powered and the cam 161 is turned to allow free movement of the sidebar 187. With this movement the torsion spring 164 is extended. Upon un-powering of the motor 160 the strength of the torsion spring 164 moves the cam 161 against the reversed sidebar 187 and upon return of the cylinder plug 185 back to its locking position the reversed sidebar 187 is moved downward onto the receiving cavity 185A of the cylinder plug 185 by the compression spring 165 and the cam 161 is turned into the locking position again without powering of the motor 160 in the reversed direction. This arrangement will reduce the power usage by half therefore doubling the life of the power source or batteries. This arrangement may require the use of the ball or other secondary blocking mechanism.

Figure 4:
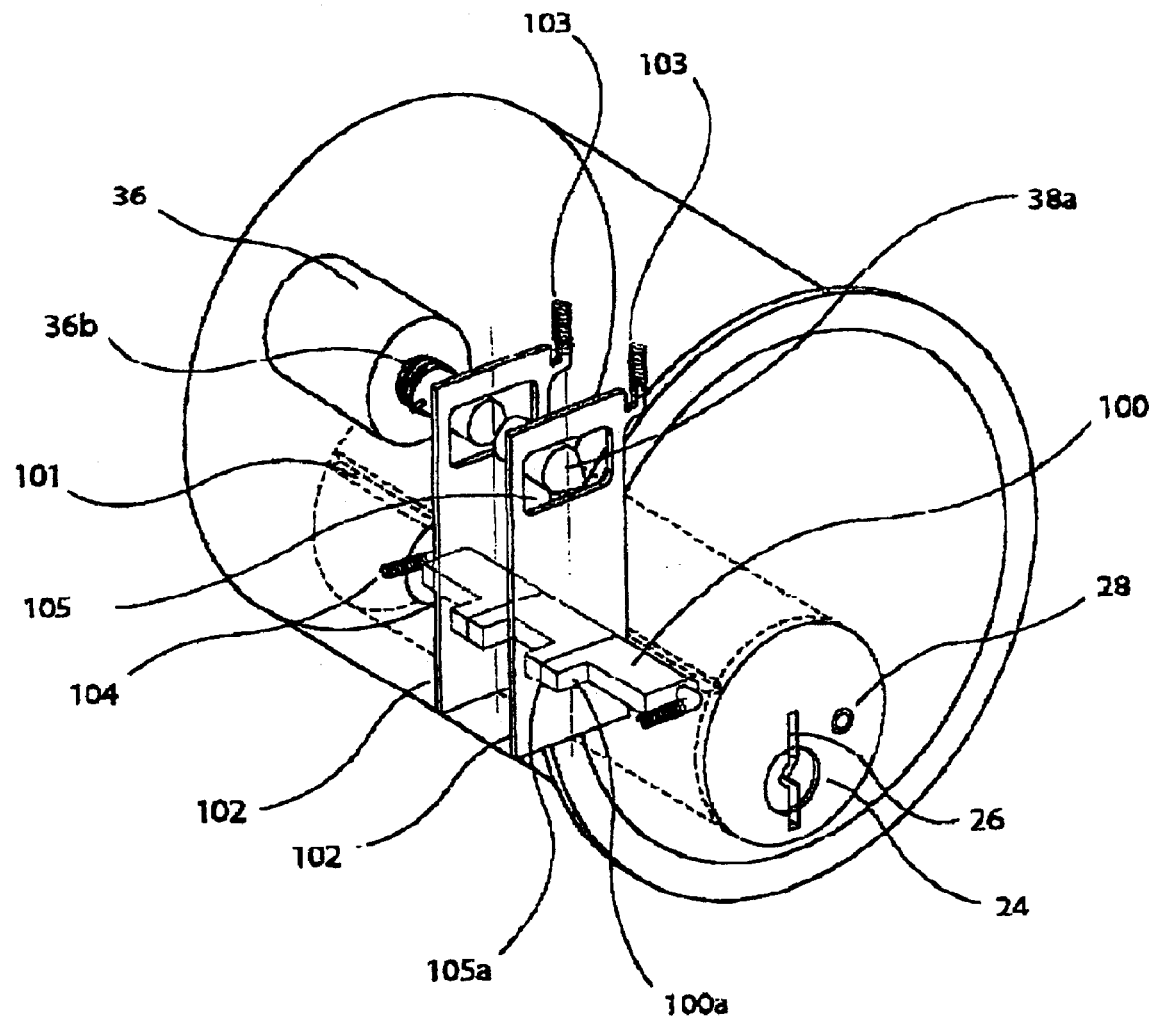
FIG. 4 shows an alternative blocking arrangement wherein the binding of the blocking means is eliminated by use of spring-loaded wafers.

FIG. 4 shows an improved electrically operated locking mechanism in which a side bar 100 in the cylinder shell engages into a V-shaped slot 101 in the cylinder plug 24. Springs 104 push the side bar 100 into the V-shaped 101. Turning of the cylinder plug 24 with a key, when permitted, pushes the side bar 100 away from the cylinder plug. The side bar 100 has an extension 100a which is normally blocked by vertical wafers 102. These wafers 102 ride vertically in a slot (not shown) and upon prior alignment allow the side bar 100 to retract into the unlatched position. Each wafer 102 has a cut out 105a (although the cut out could simply be formed by an L-shaped cut rather than a U-shaped cut as illustrated) that is in the same shape as 100a of the side bar 100. FIG. 6b shows the mechanism in its unlatched position; at this point, the key is free to turn. The solenoid 36, in its energized (retracted) mode as shown, frees the wafers 102 to move to their aligned position with the side bar 100. The wafer 102 are pushed into their aligned position by their springs 103. When the solenoid is not energized, the conic shaped edges of the solenoid plunger 38a ride on the oval shaped hole of the wafers 102 by the push of a spring 36b. The power of the spring 36b is stronger than the power of the springs 103; therefore, the wafers 102 move upward, blocking the extension members 100a of the side bar 100. When turning motion is applied to the cylinder plug 24 the side bar 100 with its locking member 100a is pushed toward the wafer 102. If the opening 105a on wafer 102 is not aligned with the locking member 100a of the side bar 100 then the cylinder plug 24 is not able to force the side bar back and turn.

In the case of premature turning motion applied to the cylinder plug 24, the side bar 100 will bind against the wafer 102. However, due to the oval shape of hole 105 of the wafer 102, no side pressure will be applied to the plunger 38a of the solenoid 36.

Figure 4A:
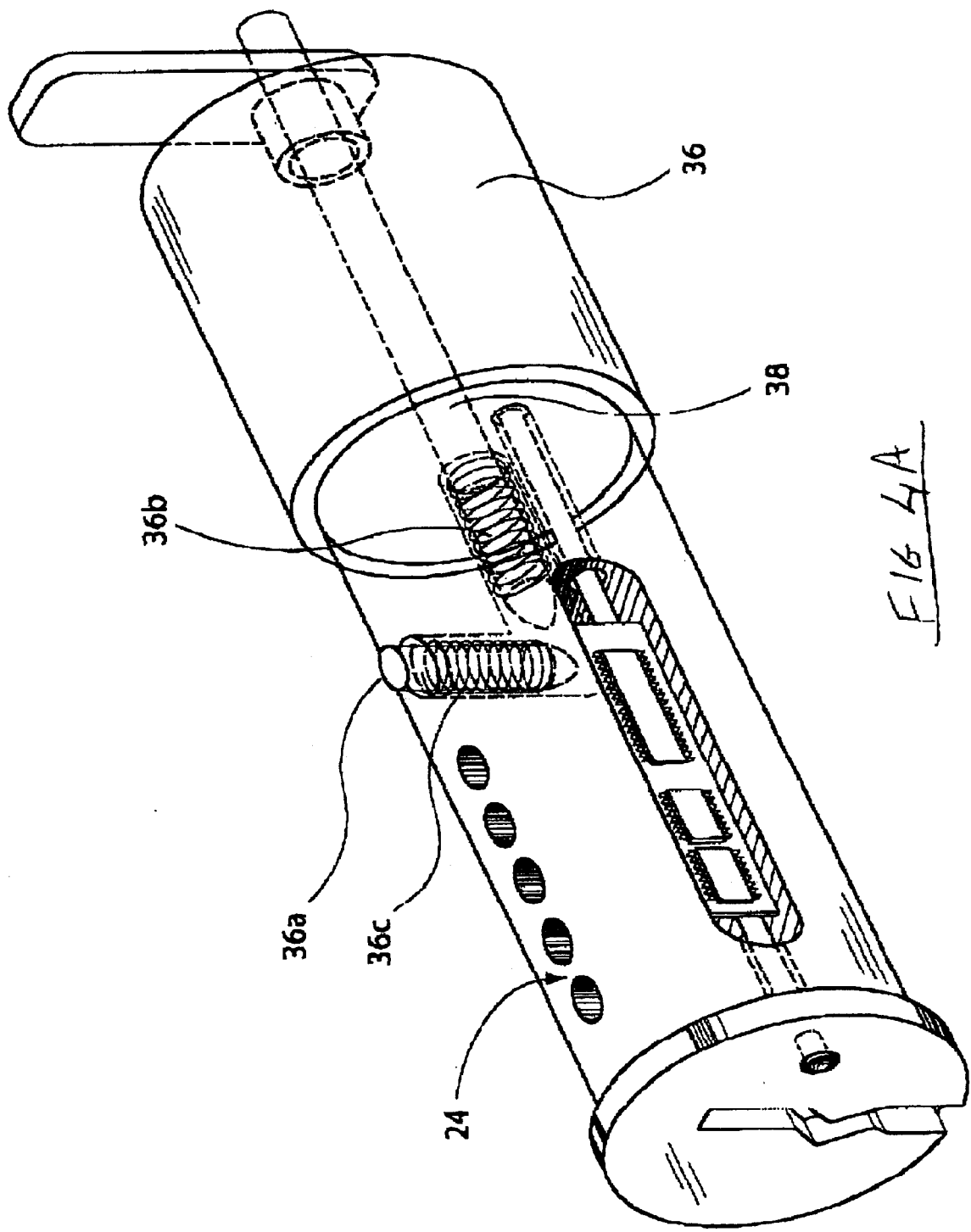
FIG. 4A is a perspective view showing another cylinder plug with solenoid, in another arrangement.

FIG. 4A shows the cylinder plug 24 fitted with another electrically operated blocking means wherein a solenoid in the same diameter as the cylinder plug 24 is situated at the rear end of the cylinder plug 24 on the same axis. The plunger or blocking pin 38 of solenoid 36 has a conic shaped tip which extends out with the help of spring 36b when not energized. The plunger 38 with the help of its spring 36b pushes a secondary pin 36a out of cylinder plug blocking its rotation. The secondary pin 36a also has a conic end where it meets the plunger 38. The secondary pin 36a also has a spring 36c which pushes the pin 36a inwards into the cylinder plug 24 (unlocked position). The springs 36c is less powerful than the spring 36b; therefore, the secondary pin 36a stays in the blocking position when the solenoid 36 is not energized. When the solenoid 36 is energized, the plunger 38 moves away from the secondary pin 36a which leaves it free to return to its natural (unlocked) position with the help of its spring 36c. At this point, the cylinder plug is free to turn.

Figure 5:
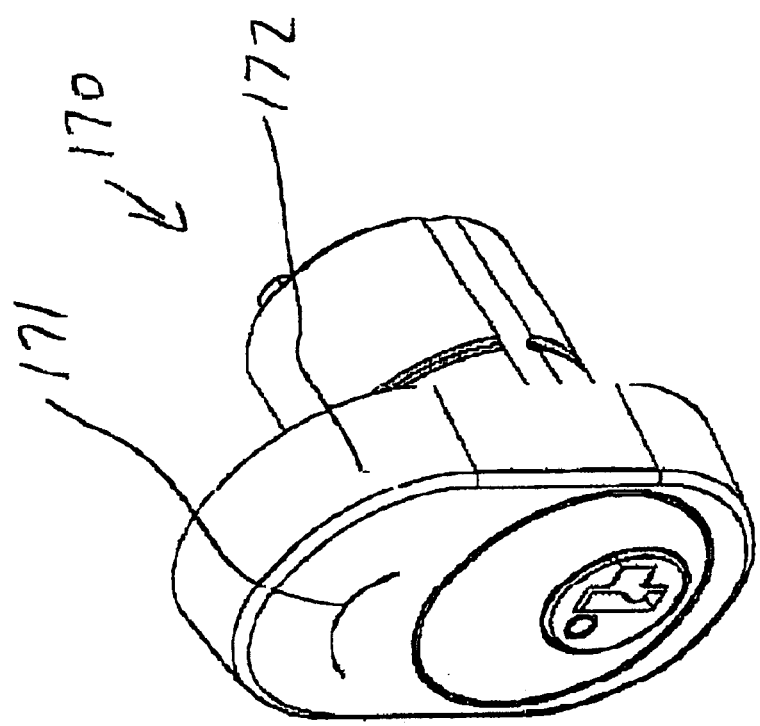
FIG. 5 shows an electromechanical lock cylinder somewhat schematic equipped with a transceiver (not shown) and antenna.

FIG. 5 shows an electromechanical cylinder 170 equipped with a small transceiver (not shown) located inside the cylinder face housing 172 with its antenna 171 embedded into the face of the cylinder face housing 172. The antenna 172 maybe located at a different location within the cylinder 170. FIG. 6 shows a number of similar cylinders with different identification communicating with the central computer 180 via its antenna 182. The central computer 180 maybe equipped with more than one transceiver connected in parallel employing a first in first out communication protocol for handling multiple instantaneous communication requests. The cylinder is equipped with this transceiver device for providing communication between the cylinders of the system and the central computer where the access data is kept. The communication between the cylinders may be established in a number of communication schemes described below.

In one preferred communication scheme the new programming data is uploaded to the cylinder 170 when the cylinder asks for this data. Cylinders 170 are set to ask for updated data, if any, from the central database in predetermined intervals such as every ten minutes. If there is any change in the data, the new data is uploaded to the cylinder and also any access data such as record of successful and unsuccessful attempts for access that has been collected by the cylinder is downloaded to the central database for history and report generation as well as any service data such as battery status for servicing of the cylinders. This communication protocol uses minimal amount of power by minimizing the amount of communication between the cylinders and the central database.

In another preferred communication scheme the transceivers are always awake waiting for a call from the central computer, which scans all the cylinders as necessary for upload and download of data. When called by the central computer the cylinder answers and engages in the communication protocol. In this half duplex communication scheme the communication between the cylinders and the central computer is always initiated by the central computer 180.

In yet another preferred communication scheme the cylinders are always active and do not store the access data at the cylinder but accesses the data each time there is a request for access by presence of a key requesting access. This scheme provides an always active two-way communication providing instant monitoring of all access activities within the facility.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. An electrically operated lock cylinder blocking arrangement, comprising:

a lock cylinder installed into a lock unit having electronic access control components requiring power, and the cylinder having a rotatable plug attached to a movable rear piece that interacts with a latch or bolt of the lock unit when a key is inserted into a keyway of the plug and the plug is rotated, a retractable blocking element positioned in a recess of a cylinder shell of the lock cylinder for reciprocal movement toward and away from the cylinder plug, between a first, blocking position and a second, retracted position, the blocking element having a long dimension oriented generally parallel to the length of the plug, and the plug having a groove within which the blocking element engages when in said first, blocking position, with spring means urging the blocking member toward the first, blocking position, the cylinder including at least one slidable wafer within the cylinder, with an opening or recess in the wafer near one end, and a motor or solenoid having a moveable member with two positions, a first position extending into the opening of the wafer and preventing sliding movement of the wafer and a second position retracted from the wafer opening allowing sliding movement of the wafer, and including a wafer spring urging the slidable wafer toward an unblocking position to which the wafer is slidable when the movable member of the motor or solenoid is retracted, and the wafer having a second end which interacts with the retractable blocking element such that the retractable blocking element can only retract from said groove and from said first, blocking position when the wafer is in said unblocking position, and the wafer and the direction of its sliding movement being such that a premature twisting of a key in the cylinder plug, tending to cam the retractable blocking element outwardly from said groove, causing a force on the wafer, will not push the wafer against said moveable member of the motor or solenoid, thus not jamming the movable member.

2. The apparatus of claim 1, wherein the moveable member of the motor or solenoid comprises an axially reciprocal plunger having a tapered tip positioned to cam the wafer to a retracted, blocking position against force of the wafer spring when the plunger re-enters the opening or recess in the wafer.

3. The apparatus of claim 1, including two said slidable wafers arranged in generally parallel relationship to one another within the cylinder.

* * * * *